(12) United States Patent
Bauer

(10) Patent No.: US 6,483,681 B1
(45) Date of Patent: Nov. 19, 2002

(54) FAULT-CURRENT PROTECTIVE SWITCHGEAR

(75) Inventor: Bernhard Bauer, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/485,964

(22) PCT Filed: Aug. 5, 1998

(86) PCT No.: PCT/DE98/02246

§ 371 (c)(1),
(2), (4) Date: Feb. 18, 2000

(87) PCT Pub. No.: WO99/09628

PCT Pub. Date: Feb. 25, 1999

(30) Foreign Application Priority Data

Aug. 18, 1997 (DE) .......................... 197 35 743

(51) Int. Cl.[7] ................................ H02H 3/16
(52) U.S. Cl. ........................................ 361/45
(58) Field of Search ........................ 361/42–50

(56) References Cited

U.S. PATENT DOCUMENTS 4,150,411 A * 4/1979 Howell .................. 361/45
5,510,945 A   4/1996 Taylor et al. ............ 361/45

FOREIGN PATENT DOCUMENTS

| DE | 283 173 | 10/1990 | ............ H02H/3/33 |
| DE | 91 10 235.9 | 10/1991 | ............ H02H/1/06 |
| DE | 40 39 921 | 6/1992 | ............ H02H/3/33 |

OTHER PUBLICATIONS

Solleder, Reinhard, "Warum Fehterstrom—Schutzchaller mit netzspannungsunabhängiger Auslösung?," etz, vol. 07, Issue 20, pp. 938–945 (No month 1986).

* cited by examiner

Primary Examiner—Ronald W. Leja
(74) Attorney, Agent, or Firm—Harness, Dickey & Pierce P.L.C.

(57) ABSTRACT

A residual current device is described that has an amplifier circuit for producing a fault voltage, which is derived from a fault current, a comparison circuit for comparing the fault voltage with a reference voltage, and a reference circuit, which is connected to a power supply unit, for producing the reference voltage as well and an operating voltage for the amplifier circuit. The residual current device also includes an arrangement that, if the output voltage from the power supply unit falls below a predetermined value, raise the reference voltage at least to the instantaneous operating voltage, at least if the fault voltage is less than the reference voltage.

17 Claims, 1 Drawing Sheet

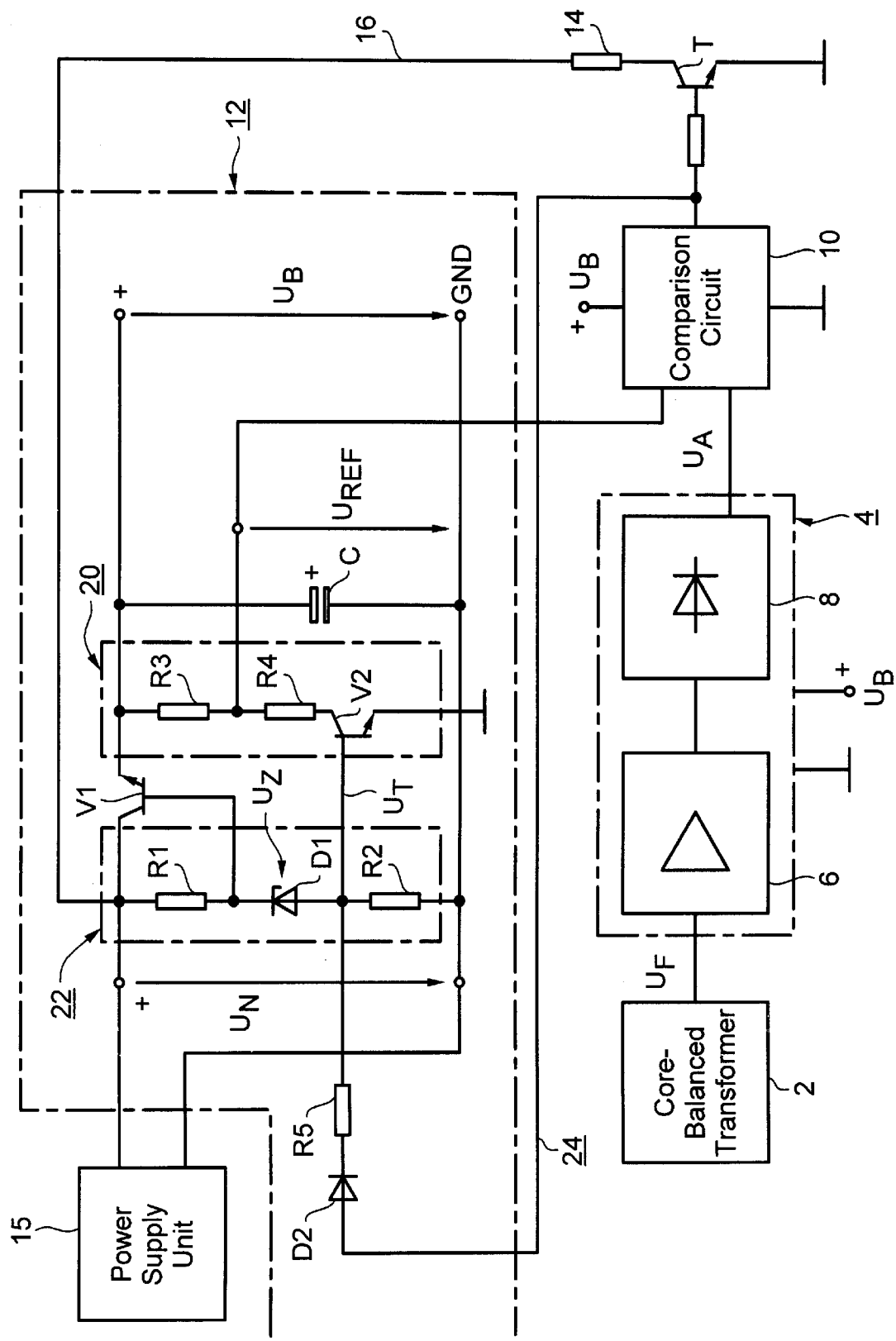

FAULT-CURRENT PROTECTIVE SWITCHGEAR

FIELD OF THE INVENTION

The present invention relates to a residual current device.

BACKGROUND INFORMATION

A residual current device is used to ensure protection against a dangerous fault current in an electrical system. Such a fault current occurs when a live conductive part makes an electrical contact with ground. This occurs, for example, when somebody touches a live part of an electrical system. The fault current then flows via the person to ground, as a body current. The residual current devices which are used for protection against dangerous body currents have to isolate the electrical system from the mains voltage in the event of a fault current that is greater than 30 mA.

The design of a residual current device is described, for example, in the article "Warum Fehlerstrom-Schutzschalter mit netzspannungsunabhängiger Auslösung?," etz, Volume 107 (1986), Issue 20, pages 938 to 945. Outline circuit diagrams and functional principles of a residual current device are described there, in particular in FIGS. 1 to 3. In this case, a distinction is drawn between two different basic types. The residual current device (RED) is a fault-current protective device in which the electrical power required for the switching process is obtained from the fault current itself, independently of the mains voltage. A differential-current or DI circuit breaker is, in contrast, a fault-current protective device in which the electrical auxiliary energy required for the switching process is taken from the mains voltage itself. Such a DI circuit breaker thus requires a mains connection and a power supply unit to operate it. The power supply unit converts the mains voltage into the supply voltage required to operate the DI circuit breaker components.

In such a DI circuit breaker, the voltage induced by the fault current in the secondary winding of the core-balanced transformer is normally amplified in an amplifier. If the fault voltage that is present at the output of the amplifier exceeds a predetermined reference voltage, then the DI circuit breaker trips. This reference voltage is generally provided by a voltage divider that is connected to a power supply unit, which supplies the electronic circuits located in the DI circuit breaker with the operating voltage required to operate it.

Any fault current or dissipation current flowing in an electrical system that is less than the tripping fault current leads to a fault voltage at the output of the amplifier, which is less than the reference voltage associated with the tripping fault current. If the mains voltage is switched off, then the operating voltage falls, and the reference voltage thus also falls, with a time constant that is dependent on the magnitude of the smoothing capacitors. If the reference voltage is less than the fault voltage at a time at which sufficient energy is still stored in the power supply unit to trip the tripping relay, the DI circuit breaker trips incorrectly.

SUMMARY OF THE INVENTION

An object of the present invention is a residual current device that avoids a fault operating state caused by the mains voltage being switched off.

The present residual current device according to the invention contains an amplifier circuit for producing a fault voltage that is derived from a fault current, a comparison circuit for comparing the fault voltage with a reference voltage, and a reference circuit, which is connected to a power supply unit, for producing the reference voltage as well as an operating voltage for the amplifier circuit, in which case means are provided which, if the output voltage from the power supply unit falls below a predetermined value, raise the reference voltage at least to the instantaneous operating voltage, at least if the fault voltage is less than the reference voltage.

In other words, if the fault voltage is less than the reference voltage at the time at which the output voltage from the power supply unit falls below the predetermined value, that is to say when the tripping condition for the tripping circuit of the residual current device is not satisfied at this time, the reference voltage is increased at least to the instantaneous operating voltage, which is in the process of falling.

Raising the reference voltage at least to the instantaneous operating voltage, preferably to the instantaneous operating voltage, ensures that the fault voltage derived from the fault current by the amplifier circuit is not less than the reference voltage as the output voltage of the power supply unit falls, since the output voltage of an amplifier circuit is, as a rule, less than the operating voltage used to operate it. This largely avoids incorrect tripping when the mains voltage is switched off.

In a further advantageous refinement of the present invention, the reference circuit contains a first voltage divider, which is connected to the operating voltage, for producing the reference voltage. That first voltage divider is connected to ground via a switching element which can be controlled as a function of the output voltage from the power supply unit. In this way, the reference voltage can be raised to the operating voltage by a simple switching process.

A transistor is preferably provided as the controllable switching element.

In a further advantageous refinement of the invention, the reference circuit contains a second voltage divider for producing a control voltage for the controllable switching element.

The second voltage divider is connected between the output voltage of the power supply unit and ground, and preferably includes a zener diode, which is connected in series, in the reverse direction, between the divider resistors of the second voltage divider, and to the base of a transistor, which is provided as the controllable switching element.

In a further embodiment of the present the invention, the output of the comparison circuit is connected to the reference circuit via a feedback circuit. This ensures that, in the event of a discontinuity in the supply voltage provided by the power supply unit, which may have been caused by actuating a tripping coil, the tripping condition required for the tripping coil to trip, namely that the fault voltage is greater than a reference voltage, is maintained.

In particular, the feedback circuit contains a diode and a resistor connected in series with it, and is connected to a control line which carries the control voltage.

In a further advantageous embodiment, the reference circuit contains a voltage stabilization circuit for producing a stabilized operating voltage from the output voltage. This creates reproducible and stable operating conditions for the residual current device.

BRIEF DESCRIPTION OF THE DRAWING

The FIGURE shows a circuit diagram of a residual current device according to the present invention.

DETAILED DESCRIPTION

According to the FIGURE, the residual current device includes a core-balanced transformer 2, downstream of which an amplifier circuit 4 is connected. The amplifier circuit 4 converts a voltage signal UF that is induced in the secondary winding of the core-balanced transformer 2 to a rectified fault voltage UA. The amplifier circuit contains an amplifier 6 and a rectifier 8 for this purpose. The amplifier circuit 4 has a comparison circuit 10, for example a comparator, connected downstream of it, in which the fault voltage UA is compared with a reference voltage URef provided by a reference circuit 12. If the fault voltage UA is greater than the reference voltage URef, the base of a switching transistor T is actuated from the output of the comparison circuit 10. A tripping relay coil 14 is connected between an output voltage UN of a power supply unit 15 and ground in the collector-emitter circuit of the switching transistor T.

The core-balanced transformer 2, amplifier circuit 4, comparison circuit 10, as well as the circuit 16 containing the tripping relay coil 14, and the switching transistor T form the tripping circuit of the residual current device.

The operating voltage UB required to operate the electronic components in this tripping circuit is provided by a reference circuit 12, at whose output the output voltage UN provided by the power supply unit 15 is present.

The output voltage UN of the power supply unit 15 is regulated down to the operating voltage UB via a voltage stabilization circuit. For this purpose, the voltage stabilization circuit contains an emitter-follower circuit with a regulating transistor V1 whose base is connected to the cathode of a zener diode D1, which is connected in series, in the reverse direction, between two divider resistors R1, R2. The series circuit including the divider resistor R1, the zener diode D1 and the divider resistor R2 is connected in parallel with the output of the power supply unit 15.

The emitter of the regulating transistor V1 is connected with a first voltage divider 20 (reference voltage divider) to ground. This first voltage divider 20 contains a series circuit including a divider resistor R3, a divider resistor R4, as well as a controllable switching element V2. The divider resistor R3 is connected to the operating voltage UB, in the exemplary embodiment of the emitter of the regulating transistor V1. The controllable switch V2 is connected between the divider resistor R4 and ground. A tap for the reference voltage URef, which is supplied to the comparator 10, is located between the divider resistor R3 and the divider resistor R4. A smoothing capacitor C connected to ground in parallel with the first voltage divider 20 is used to smooth the operating voltage UB.

When the controllable switching element V2 is closed, the reference voltage URef, which is governed by the operating voltage UB and the division ratio of the divider resistors R3 and R4, is present at the reference input of the comparator in the comparison circuit 10.

When the switching element V2 is open, the entire voltage drop in the voltage divider 20 occurs across the switching element V2, so that the operating voltage UB is present between the divider resistor R3 and the divider resistor R4.

In the exemplary embodiment, the controllable switch V2 is a bipolar npn transistor, whose base is controlled by the voltage drop across the divider resistor R2, which is connected in series with the zener diode D1. If the output voltage UN of the power supply unit 15 is greater than the zener voltage UZ of the zener diode D1, this zener diode conducts, and a control voltage corresponding to the division ratio of the divider resistors R1 and R2 is applied to the base of the transistor, which is used as the controllable switching element V2. The series circuit including the divider resistor R1, the zener diode D1 and the divider resistor R2 forms a second voltage divider 22 (control voltage divider), whose divider voltage is used as the control voltage UT for the controllable switching element V2.

If the output voltage UN of the power supply unit 15 is greater than the zener voltage UZ of the zener diode D1, this zener diode conducts, and the transistor, which is provided as the controllable switching element V2, is switched on. If the collector-emitter saturation voltage of the transistor is ignored, the first voltage divider 20 is connected to ground, that is to say the switching element V2 is closed.

If the output voltage UN of the power supply unit 15 falls below the zener voltage UZ of the zener diode D1, then the current flow through the zener diode D1 breaks down, and the control voltage UT falls to ground potential. The transistor that is used as the controllable switch V2 switches off, and the instantaneous reference voltage URef' is raised to the level of the instantaneous operating voltage UB'. This ensures that the fault voltage UA which is present at the output of the amplifier circuit 4, cannot exceed the instantaneous reference voltage URef' (which is supplied to the reference input of the comparison circuit 10 when the power supply unit 15 is switched off) of the comparison circuit, so that the switching transistor T remains in the switched-off state. This reliably prevents incorrect tripping when the power supply unit 15 is switched off.

A further advantage of the present invention is that the influence of the temperature-dependent base-emitter voltage of the regulating transistor V1 on the operating voltage UB can be largely eliminated, provided a physically identical transistor is used as a controllable switching element V2. In this case, the base-emitter voltages of the two transistors V1 and V2 are raised in comparison with the operating voltage UB, so that this is always approximately equal to the zener voltage UZ of the zener diode D1.

The output of the comparison circuit 10 is connected, via a feedback circuit 24, to the control line for the controllable switching element V2. The feedback circuit 24 contains a diode D2, which is connected in series with a resistor R5.

This circuitry ensures that the residual current device responds reliably when an unacceptable fault current occurs, even in the event of undervoltage. Such an undervoltage occurs, for example, if the power supply unit 15 is only supplied, for example, with 50 V from two external conductors, instead of from a three-phase connection at, for example, 480 V.

If the low-resistance tripping relay coil 14 is connected to the power supply unit output voltage UN, then this can be dropped in the power supply unit 15 due to the voltage drop across the protective circuitry resistances, so that this results in the current flow via the zener diode D1 being interrupted.

Without the feedback formed from the diode D2 and the resistor R5, the switching transistor, which is used as the controllable switching element V2, would switch off immediately and the reference voltage Uref would rise to the instantaneous operating voltage UB', so that the reason for tripping, namely that the fault voltage UA present across the comparison circuit 10 is greater than the reference voltage URef provided by the reference circuit 16, would immediately be canceled again. Reliable tripping is no longer ensured in this situation.

Feedback from the output of the comparison circuit 10 to the control line for the controllable switching element V2 allows the positive output voltage of the comparison device 10 to be used as the control voltage for the controllable switching element V2 and prevents the latter from opening, that is to say, in the exemplary embodiment, the transistor, which is used as the controllable switching element V2, remains switched on even in the event of voltage interruptions caused by actuation of the tripping relay coil 14.

The diode D2, which is connected at the feedback circuit 24, prevents the resistor R2 from being short-circuited in the situation when the fault voltage UA is less than the reference voltage Uref.

What is claimed is:

1. A residual current device, comprising:
   an amplifier circuit producing a fault voltage derived from a fault current;
   a comparison circuit comparing the fault voltage with a reference voltage;
   a power supply unit;
   a reference circuit coupled to the power supply unit producing an operating voltage for the amplifier circuit and the reference voltage, the reference circuit including an arrangement that raises the reference voltage to at least an instantaneous operating voltage if an output voltage of the power supply unit falls below a predetermined value and if the fault voltage is less than the reference voltage;
   a first voltage divider coupled to the operating voltage and producing the reference voltage, the first voltage divider further being coupled to ground via a controllable switching element, the switching element being controlled as a function of an output voltage of the power supply unit;
   a second voltage divider producing a control voltage for the controllable switching element; and
   a feedback circuit, an output of the comparison circuit being connected to the reference circuit via the feedback circuit, wherein the feedback circuit includes a diode and a resister connected in series, the feedback circuit being connected to a control line that carries the control voltage.

2. The residual current device according to claim 1, wherein the controllable switching element includes a transistor.

3. The residual current device according to claim 1, wherein the second voltage divider is connected between the output voltage of the power supply unit and ground.

4. The residual current device according to claim 1, wherein the second voltage divider includes a zener diode and two divider resistors.

5. The residual current device according to claim 4, wherein the controllable switching element is a transistor, a base of the transistor being connected to the zener diode.

6. The residual current device according to claim 1, wherein the reference circuit includes a voltage stabilization circuit producing a stabilized operating voltage from the output voltage of the power supply unit.

7. A residual current device, comprising:
   an amplifier circuit producing a fault voltage derived from a fault current;
   a comparison circuit comparing the fault voltage with a reference voltage;
   a power supply unit;
   a reference circuit coupled to the power supply unit producing an operating voltage for the amplifier circuit and the reference voltage, the reference circuit including an arrangement that raises the reference voltage to at least an instantaneous operating voltage if an output voltage of the power supply unit falls below a predetermined value and if the fault voltage is less than the reference voltage; and
   a feedback circuit, an output of the comparison circuit being connected to the reference circuit via the feedback circuit, wherein the feedback circuit includes a diode and a resister connected in series, the feedback circuit being connected to a control line that carries a control voltage.

8. The residual current device according to claim 7, wherein the arrangement includes a first voltage divider coupled to the operating voltage and producing the reference voltage, the first voltage divider further being coupled to ground via a controllable switching element, the switching element being controlled as a function of an output voltage of the power supply unit.

9. The residual current device according to claim 8, wherein the controllable switching element includes a transistor.

10. The residual current device according to claim 8, wherein the arrangement further includes a second voltage divider producing the control voltage for the controllable switching element.

11. The residual current device according to claim 10, wherein the second voltage divider is connected between the output voltage of the power supply unit and ground.

12. The residual current device according to claim 10, wherein the second voltage divider includes a zener diode and two divider resistors.

13. The residual current device according to claim 12, wherein the controllable switching element is a transistor, a base of the transistor being connected to the zener diode.

14. The residual current device according to claim 9, wherein the reference circuit includes a voltage stabilization circuit producing a stabilized operating voltage from the output voltage of the power supply unit.

15. A residual current device, comprising:
    an amplifier means for producing a fault voltage derived from a fault current;
    a comparison means for comparing the fault voltage with a reference voltage;
    a reference means coupled to a power supply unit, for producing an operating voltage for the amplifier means and the reference voltage, the reference means including an arrangement that raises the reference voltage to at least an instantaneous operating voltage if an output voltage of the power supply unit falls below a predetermined value and if the fault voltage is less than the reference voltage; and
    a feedback circuit, an output of the comparison means being connected to the reference means via the feedback circuit, wherein the feedback circuit includes a diode and a resister connected in series, the feedback circuit being connected to a control line that carries a control voltage.

16. The residual current device according to claim 15, wherein the arrangement includes a first voltage divider coupled to the operating voltage further being coupled to ground via a controllable switching element, the switching element being controlled as a function of an output voltage of the power supply unit.

17. The residual current device according to claim 16, wherein the arrangement further includes a second voltage divider for producing the control voltage for the controllable switching element.

* * * * *